(12) United States Patent
Ding et al.

(10) Patent No.: US 7,949,994 B2
(45) Date of Patent: May 24, 2011

(54) METHOD AND COMPUTER PROGRAM PRODUCT FOR VIEWING EXTENDIBLE MODELS FOR LEGACY APPLICATIONS

(75) Inventors: Li Ding, Toronto (CA); Donald J. Yantzi, North York (CA)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 11/844,121

(22) Filed: Aug. 23, 2007

(65) Prior Publication Data
US 2009/0055797 A1    Feb. 26, 2009

(51) Int. Cl.
*G06F 9/44* (2006.01)
(52) U.S. Cl. .......................... 717/105; 717/104
(58) Field of Classification Search .................. 717/104, 717/105, 131–133, 154–157
See application file for complete search history.

(56) References Cited

U.S. PATENT DOCUMENTS

| | | | | |
|---|---|---|---|---|
| 5,644,740 A * | 7/1997 | Kiuchi | ............. | 715/853 |
| 5,689,711 A * | 11/1997 | Bardasz et al. | ............. | 717/105 |
| 5,911,072 A * | 6/1999 | Simonyi | ............. | 717/105 |
| 6,947,951 B1 * | 9/2005 | Gill | ............. | 1/1 |
| 6,968,340 B1 * | 11/2005 | Knowles | ............. | 1/1 |
| 6,986,120 B2 * | 1/2006 | Reddy et al. | ............. | 717/104 |
| 7,398,512 B2 * | 7/2008 | Martin et al. | ............. | 717/105 |
| 7,480,893 B2 * | 1/2009 | Berenbach et al. | ............. | 717/104 |
| 7,844,944 B2 * | 11/2010 | Gutberlet et al. | ............. | 717/105 |
| 2005/0076328 A1 * | 4/2005 | Berenbach et al. | ............. | 717/104 |
| 2005/0120332 A1 * | 6/2005 | Martin et al. | ............. | 717/105 |
| 2005/0132336 A1 * | 6/2005 | Gotwals et al. | ............. | 717/127 |

OTHER PUBLICATIONS

Mills et al., "A Knowledge-Based Method for Inferring Semantic Concepts from Visual Models of System Behavior," Jul. 2000, ACM, p. 306-337.*
Noack et al., "A Space of Layout Styles for Hierarchical Graph Models of Software Systems," May 2005, ACM, p. 155-214.*
G.W. Furnas, "The Fisheye View: A New Look at Structured Filed.", Bell Lab Tecnical Memorandum #81-11221-9, Oct. 2, 1981.
B.B. Bederson, et al., "Pad++: A Zooming Graphical Interface for Exploring Alternate Interface Physics.", Proc. of UIST 1994.

* cited by examiner

*Primary Examiner* — Wei Y Zhen
*Assistant Examiner* — Qing Chen
(74) *Attorney, Agent, or Firm* — Cantor Colburn LLP; Libby Toub

(57) ABSTRACT

A method and computer program product of incrementally visualizing graphical extensible models for legacy software applications via a user interface are provided. A graph of nodes and connections showing only the highest level of details are presented. Each node that contains additional, lower level, details is shown with an expansion icon that may be selected to see additional levels of detail for the node. When selected, the user interface drills down to show the next lowest level of details for that artifact within a visual boundary of the original artifact that was expanded. Because of the nested, hierarchical nature of the model, relationships between higher level artifacts can be inferred from explicit relationships between lower level artifacts. When the node is expanded, any connections that previously connected to the higher level artifact are updated to connect to the appropriate artifact in the lower level details.

5 Claims, 2 Drawing Sheets

METHOD AND COMPUTER PROGRAM PRODUCT FOR VIEWING EXTENDIBLE MODELS FOR LEGACY APPLICATIONS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

This invention relates to legacy software applications, and particularly to genetically visualizing and navigating extendible application models for legacy software applications in a unified diagram.

There are many "legacy" software applications that are utilized by businesses. These applications tend to be large, monolithic in structure, and lacking in documentation. The first step in maintaining and reusing these applications is to understand their architecture. Generating models and using graphical diagram tools to visualize application structure can be an effective way to help in understanding the applications.

However, it is expected that, for many legacy applications, these generated models will be quite large, consisting of thousands of nodes and connections. In this situation, user interface complexity becomes a big issue. For example, how should the model be displayed such that it provides meaningful information to the user and is easily navigable, without overwhelming the user with large volumes of information and user interface (UI) complexity. This becomes more of an issue in the modern Integrated Development Environment (IDE) which divides the screen window into many small views.

The traditional approach in commercial IDEs to display a large model is to provide filtering capability on top of the model to either include or exclude a subset of the model in the UI. Usually, this takes the form of the user specifying a name or attribute filter that is compared to each artifact. This can be useful if the artifacts follow a standard naming convention, but is ineffective if a name pattern cannot be derived that filters only the artifacts the user is interested in. Another drawback to such filtering is that connections between artifacts that are showing and artifacts that are filtered out are not shown. This forces the user to make a trade-off between a simpler UI and a loss of information being shown.

The traditional approach to displaying models that contain multiple levels of detail is to have the user specify which level of detail the user wants to see and only show details for that level. This is usually accomplished by providing a menu option to select the level of details. There are a couple drawbacks to this approach. First, the lower levels of detail may have thousands of nodes and connections and may contain so much information that the user and the UI hardware are both overwhelmed. Second, the approach described above causes each artifact type to determine how many levels of details are available, so some artifact types may have only two levels of details while others may have five. However, the user may want to see the second level of details for some artifacts, the third level of details for some artifacts, and the fourth level of details for others.

A second approach, the full-zoom approach, may reveal different level of details in datasets according to the zoom level chosen by user, i.e., the full-zoom approach provides details only on a current zoom level without higher level data. The problem is that the user does not have enough context when the user is zoomed in.

A third approach is to show details for the part that the user selected while showing less detail for other parts of the structure. The third approach uses a degree of interest function to decide which part should be shown in details.

The second and third approaches, however, do not define a unified semantic model which can be visualized consistently across different types of input to the modeling tool. In order to apply the second and third approaches, the diagram user interface developer has to understand the particular application and apply the approach case by case which is tedious and inefficient.

It would be desirable to have an approach which generically and effectively navigates very large extensible application models in an IDE, which would greatly improve the usability of the diagram tool, and which would make it easy for an IDE tool developer to build the navigation function generically.

SUMMARY

In accordance with an exemplary embodiment, a method of incrementally visualizing graphical extensible models for legacy software applications via a user interface is provided. A model for a legacy software application is generated, and the model includes artifacts having relationships to one another. Direct connections for the relationships between top level artifacts in the model are displayed in a top level diagram.

Expansion icons for the top level artifacts that contain lower level artifacts are provided, and the expansion icons for the top level artifacts containing lower level artifacts may be selected to drill down to the lower level artifacts. The lower level artifacts are scanned to determine inferred relationships between the top level artifacts and other top level artifacts.

Direct connections for the inferred relationships between the top level artifacts to the other top level artifacts are displayed in the top level diagram, without having to select the expansion icons. Direct connections are displayed for relationships between the lower level artifacts in the lower level diagram, and the lower level diagram is displayed in response to the expansion icons being selected for the top level artifacts having the lower levels. After expansion, the direct connections for inferred relationships between the top level artifacts continue to be displayed, but the source and target endpoints are updated to point to the lower level artifacts in which the inferred relationships are computed from. The direct connections for explicit relationships between the top level artifacts continue to be displayed without change. The top level artifacts are displayed with the lower level artifacts.

A computer program product, tangibly embodied on a computer readable medium, for providing graphical extensible models for legacy software applications via a user interface. The computer program product includes instructions for causing a computer to execute the above-described method.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
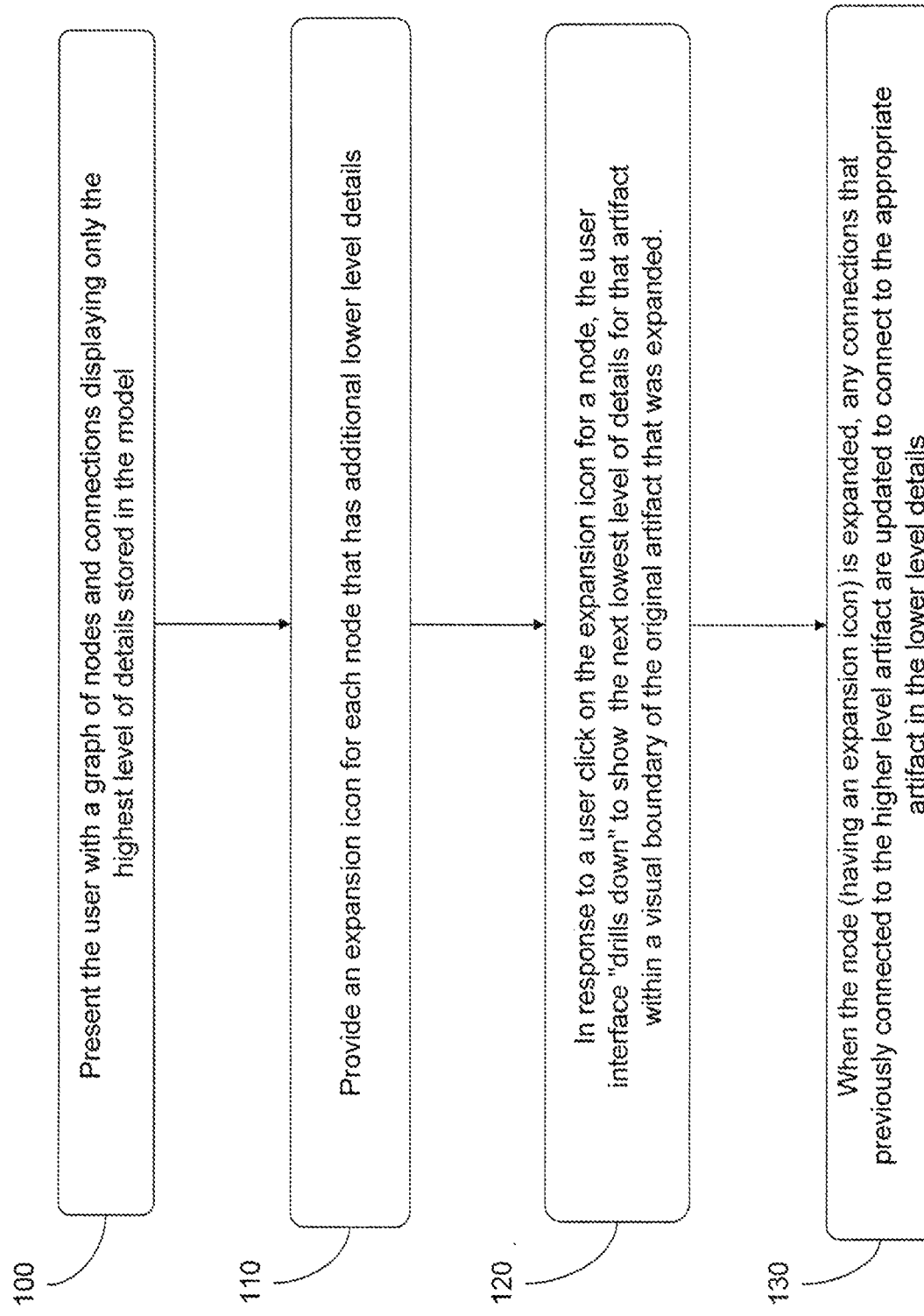
FIG. 1 illustrates a method for visually navigating information of a hierarchical model for a legacy software application.

The detailed description explains the preferred embodiments of the invention, together with advantages and features, by way of example with reference to the drawings.

DETAILED DESCRIPTION OF THE EXEMPLARY EMBODIMENT

An exemplary embodiment address two sub-problems which include how to display only the subset of information that the user is specifically interested in, and how to generically visualize a model that contains multiple levels of detail to help the navigation (or hierarchical data).

The model in the exemplary embodiment illustrates a framework and method for building and displaying a unified model of a software application that uses multiple artifact types. At the highest level, the framework consists of a model definition and collectors. The model comprises generic, high level constructs, such as "artifacts" and "relationships" between artifacts. Although the generic model may be extended with artifact specific models, the model is not meant to be limited to artifact specific models. Extensions of the model may be provided by tool writers and plugged into the generic model. Extensions may provide additional artifact types, relationships, and details about the artifact types. The collectors populate the model with information about development and runtime artifacts used by the application and relationships between those artifacts. Multiple collectors may be used to populate a single model instance.

In accordance with the exemplary embodiment, the model is extensible, and multiple levels of details are contained in the hierarchy structure. As non-limiting examples, consider a source file written in a procedural programming language in which, at the highest level, there is an artifact in the model to represent the source file. At the next lower level of details, each procedure in the source file could be stored, and at the lowest level of details a flow chart could be stored for each procedure. This may be illustrated as follows:

Level 1: Source file artifacts
Level 2: Procedure artifacts
  Level 3: Statement artifacts (e.g., modeled as a flow chart).

In the exemplary embodiment, the graphical diagram may display the model graphically with each artifact in the model rendered as a node and relationships rendered as connections between nodes. Each artifact type can control how its user interface (UI) is rendered, and connections can take different forms such as solid or dashed lines.

As discussed herein, the exemplary embodiment describes a generic way to visualize the unified hierarchical model of a legacy software application which may address the sub-problems described above in, e.g., a single solution. The exemplary embodiment may provide the user with a functional zoom capability to display and navigate the underlying application model. The exemplary embodiment allows any model to be plugged in for a specific layer of artifacts and applies functional zoom on top of the model. Each nested layer could be its own modeling language, unrelated to layers above and below. Because the model is extensible and different third party tooling can be applied to contribute to the model and specify how to visualize the model, the exemplary embodiment provides a general way to display the extendible model. Moreover, the model allows each layer's visualization to be customized.

Turning now to the drawings in greater detail, it will be seen that FIG. 1 illustrates a method for visually navigating information of a hierarchical model for a legacy software application. In the exemplary embodiment, the user may initially be presented with a graph of nodes and connections showing only the highest level of details stored in the model at 100. Each node that has additional, lower level, details is decorated with an expansion icon (such as, e.g., a plus sign or arrowhead) at 110. This allows the user to choose which of the nodes that the user wishes to see additional levels of detail for. The user may click on the expansion icon for a node, and in response to the click, the user interface "drills down" to show the next lowest level of details for that artifact within a visual boundary of the original artifact that was expanded at 120.

The model may visually contain inferred relationships and explicit relationships between artifacts. Because of the nested, hierarchical nature of the model, relationships between higher level artifacts can be inferred from explicit relationships between lower level artifacts. When the node (having an expansion icon) is expanded, any connections (inferred from lower level relationships) that previously connected to the higher level artifact are updated to connect to the appropriate artifact in the lower level details, and any connections whose target or source is the higher level artifact continue to point to the higher level artifact at 130.

In accordance with the exemplary embodiment, the user gains much better control over the UI. The user may start with a very high level picture of the model and then drill down on the parts that the user is interested in. Meanwhile, the other surrounding artifacts are still shown at their highest level and all relationships are still visible.

On demand loading is provided in the exemplary embodiment. As a non-limiting example, if the model were large enough that it was infeasible to completely populate up-front, the exemplary embodiment would allow for only the highest level artifacts to be initially added to the model and for the "sub-model" of each artifact to be loaded as required (i.e., when the user expands to see the details of the artifact, the sub-model is loaded). In the exemplary embodiment, the initial build and display of the model may be faster while the relationships between higher level artifacts that are inferred from lower level details of the artifacts are not shown. Furthermore, the details for what is shown when an artifact is expanded could be determined at runtime. When the user expands an artifact, the user may be prompted with a list of options of the type of information that the user may like populated into the model and displayed. As such, when the user expands an artifact, if there are two or more models for the next lower level, the exemplary embodiment allows the user to choose which model to display. For example, when expanding a procedure that may be in the source file, the user may be given the option of viewing either a flow chart or data flow diagram for the procedure.

Moreover, the exemplary embodiment is not restricted to any specific legacy application and provides a general approach to visualize an extensible application model which can be extracted from many different legacy applications.

In accordance with the exemplary embodiment, using the incremental viewing as described herein, a diagram may start by displaying only top level details. The attributes of the top level artifacts and relationships (either explicit or inferred) at the top level are drawn in canvas. The user may choose the nodes that the user interested in and expand these nodes. When the nodes are expanded, the details from lower levels are drawn, and the un-selected node(s) remains unchanged.

As non-limiting examples, two exemplary processes (e.g., algorithms) may be used for drawing the diagram on a canvas. The term canvas is used to represent the area of the UI device where the diagram will be visually rendered, which may be understood within the context of an editor or window. The term draw is used to represent the programmatic steps of visually rendering a graphic on the canvas.

First, an exemplary process for drawing the initial diagram is provided below, which may be used when a model is first displayed:

for each top level artifact in the model
    draw a node on the canvas that corresponds to the artifact
for each direct connection between top level artifacts in the model
    draw a connection on the canvas starting at the source node
        and terminating at the target node
for each top level artifact in the model
    if the artifact contains lower level details
        add an expansion icon to the artifact's node on the canvas
        recursively scan through the artifacts lower level details building a list of inferred relationships
        for each relationship in the list:
            if the relationship is to an artifact outside of the current artifact then add an inferred relationship to the canvas starting at the node for the current top level artifact and terminating at the node for the other top level artifact Second, an exemplary process for expanding an artifact (e.g., a node) is provided below, in which may be used when the user expands an artifact that contains lower level details:

the sub-graph for the artifact is drawn inside of the node for the expanded artifact using the same algorithm as described above for drawing the initial diagram
all previous outgoing connections from the expanded artifact, that were inferred based on lower level details, are updated so that their source is now the appropriate lower level artifact
all previous incoming connections to the expanded artifact, that were inferred based on lower level details, are updated so that their target is now the appropriate lower level artifact One implementation of the above first and second non-limiting examples of exemplary processes is to build on top of Eclipse Graphical Editing Framework (GEF). When the diagram is initially presented, GEF EditParts (the control classes of model node visual representation) and ConnectionEditParts (control class of model relationship visual representation) are created for top level model elements and relationships among them. When the user expands the diagram, the corresponding EditParts and ConnectionEditParts are created, and as a result, the lower levels of model details are displayed.

Figure 2:
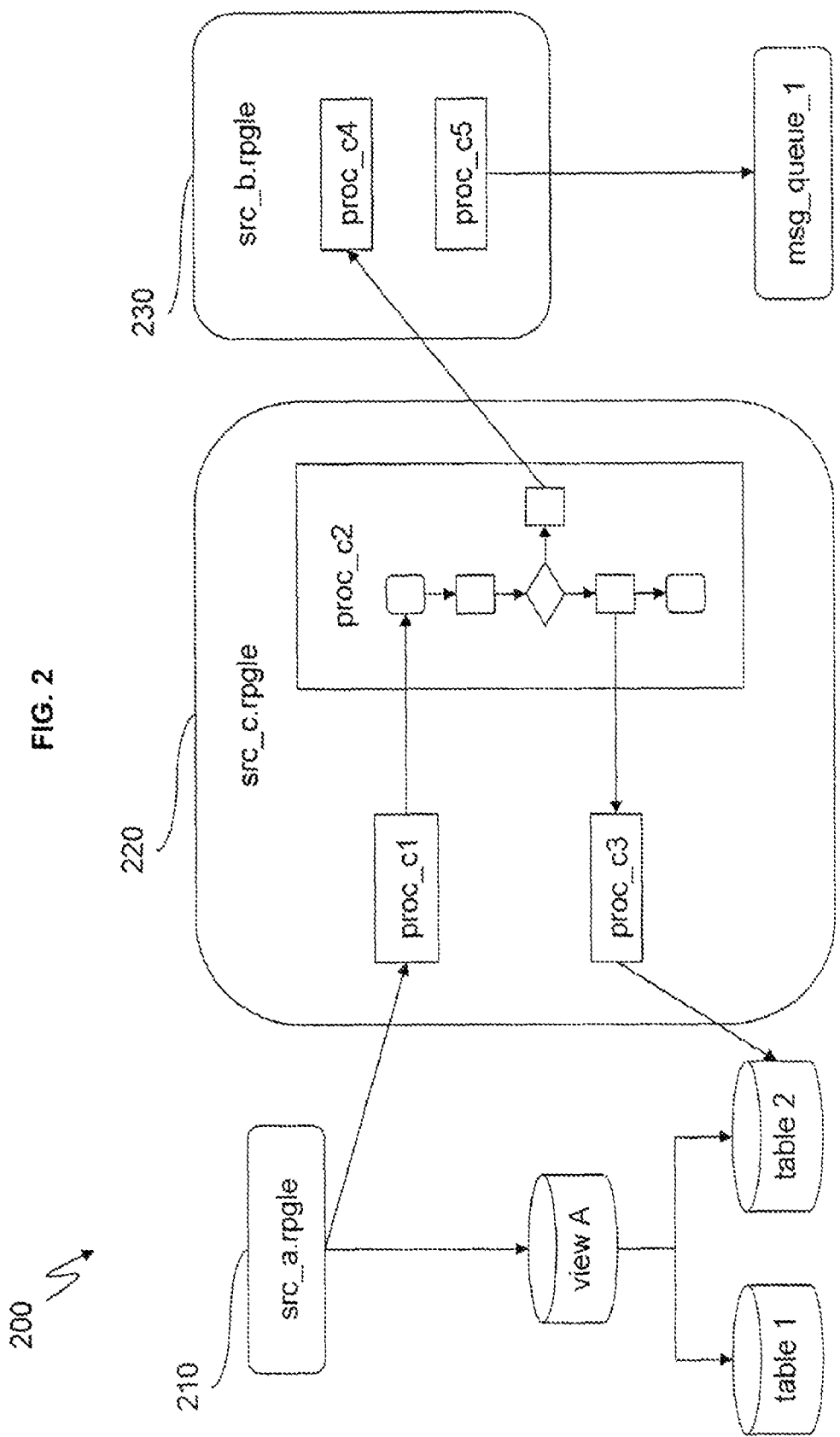
FIG. 2 illustrates a graphical diagram with multiple levels of details in accordance with the exemplary embodiment.

FIG. 2 illustrates a graphical diagram with multiple levels of details via a user interface in accordance with the exemplary embodiment. The user interface may be applied for any legacy application using the incremental viewing capabilities discussed herein (expansion icons are not shown in the diagram 200).

In the diagram 200, the highest level artifacts include three source files src_a.rpgle 210, src_b.rpgle 220, and src_c.rpgle 230, two database tables table 1 and table 2, a database view view A, and a message queue msg_queue_1.

The source files src_b.rpgle 220 and src_c.rpgle 230 have both been expanded to show lower level details. As non-limiting examples, a call graph may be used for the procedures contained inside the source files src_b.rpgle 220 and src_c.rpgle 230. The source file src_b.rpgle 220 includes procedures proc_c1, proc_c2, and proc_c3, and the source file src_c.rpgle 230 includes procedures proc_c4 and proc_c5. The procedure proc_c2 within src_c.rpgle 220 has been expanded to display the lower level details (e.g., a flow chart of the source code inside of the procedure proc_c2) of the procedure proc_c2. In accordance with the exemplary embodiment, various connections to nodes may be illustrated in the diagram 200. It is understood, that the depictions illustrated in the diagram 200 are only for explanatory purposes and are not meant to be limiting.

As non-limiting examples, the exemplary embodiment may be implemented in a device (e.g., general purpose computer) which includes a processor executing computer program code stored on a storage medium in order to perform the processes described herein. The device may include or may be operatively coupled to a display screen. It is understood that other processor-based devices (e.g., servers) may implement the exemplary process described herein.

As discussed herein, an inferred relationship is a relationship not explicitly defined in higher level container artifacts but computed from the relationships defined at lower levels. For example, within the flow chart model, there could be a call to an external procedure defined in a different source file which would be modeled as a relationship between that node in the source flow chart and the start of the flow chart inside of the called procedure. This direct relationship implies that there is an implicit "calls" relationship between the two procedures stored in the model at the next higher level of details, which in turn implies a dependency relationship between the two source files. If the runtime artifacts (e.g., programs and libraries) are included in the model then there will also be at least one direct relationship between each source file and its compiled program or library object.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the exemplary embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of incrementally visualizing graphical extensible models for legacy software applications via a user interface comprising:
   displaying direct connections for relationships between top level artifacts in a top level diagram of a graphical extensible model;
   providing expansion icons for the top level artifacts that contain lower level artifacts, wherein the expansion icons for the top level artifacts containing lower level artifacts may be selected to drill down to the lower level artifacts;
   scanning the lower level artifacts to determine inferred relationships between the top level artifacts and other top level artifacts, wherein the other top level artifacts are different from the top level artifacts;
   displaying direct connections for the inferred relationships between the top level artifacts and the other top level artifacts in the top level diagram, without having to select the expansion icons;
   displaying direct connections for relationships between the lower level artifacts in a lower level diagram of the graphical extensible model, wherein displaying the direct connections in the lower level diagram is in response to the expansion icons being selected for the top level artifacts containing the lower level artifacts;
   displaying the top level artifacts with the lower level artifacts in response to the expansion icons being selected; and
   updating source and target endpoints of the inferred relationships between the top level artifacts and the other top level artifacts, in response to the expansion icons being selected, so that the source or target endpoints point to the lower level artifacts in which the inferred relationships are computed from.

2. The method of claim 1, wherein the direct connections represent at least one of incoming and outgoing connections, and wherein the top level and lower level artifacts are displayed as nodes.

3. The method of claim 1, wherein the drilling down applies recursively for selected expansion icons.

4. The method of claim 1, wherein the inferred relationships are not explicitly defined in the top level artifacts, and wherein the inferred relationships are computed from relationships of the lower level artifacts.

5. A computer program product, tangibly embodied on a non-transitory computer readable medium, for incrementally visualizing graphical extensible models for legacy software applications via a user interface, the computer program product including instructions for causing a computer to execute a method, comprising:
   displaying direct connections for relationships between top level artifacts in a top level diagram of a graphical extensible model;
   providing expansion icons for the top level artifacts that contain lower level artifacts, wherein the expansion icons for the top level artifacts containing lower level artifacts may be selected to drill down to the lower level artifacts;
   scanning the lower level artifacts to determine inferred relationships between the top level artifacts and other top level artifacts, wherein the other top level artifacts are different from the top level artifacts;
   displaying direct connections for the inferred relationships between the top level artifacts and the other top level artifacts in the top level diagram, without having to select the expansion icons;
   displaying direct connections for relationships between the lower level artifacts in a lower level diagram of the graphical extensible model, wherein displaying the direct connections in the lower level diagram is in response to the expansion icons being selected for the top level artifacts containing the lower level artifacts;
   displaying the top level artifacts with the lower level artifacts in response to the expansion icons being selected; and
   updating source and target endpoints of the inferred relationships between the top level artifacts and the other top level artifacts, in response to the expansion icons being selected, so that the source or target endpoints point to the lower level artifacts in which the inferred relationships are computed from.

* * * * *